Patented Apr. 3, 1934

1,953,286

UNITED STATES PATENT OFFICE 1,953,286

CHLORINATION OF PARAFFIN WAXES

Edwin Joseph Barth, Chicago, Ill., assignor to Sinclair Refining Company, New York, N. Y., a corporation of Maine No Drawing. Application May 28, 1932,
Serial No. 614,303

3 Claims. (Cl. 260—162)

My invention relates to improvements in the chlorination of paraffin waxes. More particularly my invention relates to the production of chlorinated paraffin waxes of improved color.

The conventional procedure for chlorinating paraffin waxes comprises passing chlorine gas through a body of molten wax, usually in the presence of a catalyst such as crystalline iodine, until the desired proportion of chlorine has been absorbed by the wax. The colors of the chlorinated waxes so produced range from red through dark brown to black as the chlorine content of the product increases.

I have found that discoloration of the wax during chlorination is not a direct consequence of the chlorination but is rather the result of side reactions due to the evolution of hydrochloric acid, and I have been able to produce chlorinated waxes of much better color, than those of corresponding chlorine content produced in the conventional manner, by removing hydrochloric acid as rapidly as evolved during the chlorination.

In accordance with my present invention, I subject the wax to chlorination over a body of water containing an insoluble carbonate, such as calcium carbonate or magnesium carbonate. Hydrochloric acid evolved during the chlorination is immediately dissolved in the water and neutralized by reaction with the insoluble carbonate with liberation of carbon dioxide. I am thus able to produce chlorinated waxes ranging from white to pale yellow in color as compared to chlorinated waxes of corresponding chlorine content but produced in the conventional manner ranging from red to dark brown in color.

For example, I have chlorinated each of two samples of paraffin wax for 18-20 hours at 180° F., the first sample being chlorinated over a body of water containing an insoluble carbonate in accordance with the invention and the second sample being chlorinated in the conventional manner. Following chlorination the first sample had a chlorine content of 15.02% and a color, when melted, of 1—N. P. A. and the second sample had a chlorine content of 11.0% and a color, when melted, darker than 8+N. P. A.

I have noted that the chlorinated waxes produced in the conventional manner usually consist of a mixture of a harder unchlorinated part which of itself is of good color and a softer chlorinated part which is the part causing discoloration of the mixture. I have noted that the chlorinated waxes produced in accordance with this invention also usually consist of a mixture of a harder unchlorinated part and a softer chlorinated part, but in the chlorinated waxes of this invention the softer chlorinated part as well as the harder unchlorinated part is of good color.

I claim:

1. In the chlorination of paraffin waxes the improvement which comprises subjecting the wax to chlorination over a body of water containing an insoluble carbonate capable of reaction with hydrochloric acid.

2. In the chlorination of paraffin waxes the improvement which comprises subjecting the wax to chlorination over a body of water containing calcium carbonate.

3. In the chlorination of paraffin waxes the improvement which comprises subjecting the wax to chlorination over a body of water containing magnesium carbonate.

EDWIN JOSEPH BARTH.